Patented Dec. 3, 1940

2,223,850

UNITED STATES PATENT OFFICE 2,223,850

PROCESS FOR REFINING AND OBTAINING VALUABLE PRODUCTS FROM TALL OIL

Frederick H. Gayer and Charles E. Fawkes, Chicago, Ill., assignors to Continental Research Corporation, Chicago Heights, Ill., a corporation of Illinois No Drawing. Application October 18, 1937, Serial No. 169,656

15 Claims. (Cl. 260—97.5)

This invention relates to the refining and obtaining of valuable products from tall oil and in particular to the treatment of tall oil with sulphuric acid to yield a refined tall oil of improved color and clarity, and at the same time recover and isolate therefrom minor quantities of valuable and useful constituents.

Many attempts have been made in the past to refine tall oil, a by-product of sulphate or kraft paper pulp manufacture, and a particularly rich source thereof is from coniferous woods originating in the southern part of the United States. Tall oil is obtained by acidification and other treatment of the black liquor soap which is salted out and rises to the surface of the black liquor on standing, and is composed preponderantly of higher fatty acids and resin acids which together make up about 80 to 90 per cent of its weight. The balance consists of coloring substances (oxidized resin acids) and unsaponifiable matter. The latter is composed of hydrocarbons and cyclic alcohols belonging to the group of phytosterols of which tall oil is an unusually rich source.

Our co-pending application No. 169,655, filed October 18, 1937, relates to the removal of the petroleum insoluble coloring matter and the phytosterol by means of hydrochloric acid; and our co-pending application No. 169,654, filed October 18, 1937, deals with the separation of the fatty and resin acids from each other. Our present invention is concerned with the removal of the coloring matter and a large portion of the unsaponifiable substances, including the phytosterol, and consists of the treatment of tall oil or a specially prepared solution of tall oil in certain organic solvents, such as hydrocarbons, with sulfuric acid under certain special conditions.

The major components of tall oil, such as fatty acids and resin acids, are of an unsaturated molecular nature. A large proportion of the unsaponifiable matter contained therein is also molecularly unsaturated. For instance, the iodine numbers of these three components, as isolated from a southern tall oil, are as follows:

| | Iodine number |
|---|---|
| Fatty acids | 128 |
| Resin acids | 152 |
| Unsaponifiable (acid number 2.7) | 148 |

Obviously the aim of a practical process for refining tall oil is the elimination of the coloring and the inert unsaponifiable matter without affecting the fatty and resin acids. Therefore, the means employed in such a process must be highly selective in attacking the coloring and unsaponifiable matter to the exclusion of the fatty and resin acids.

We have found that by treating solutions of tall oil prepared in certain specific ways with certain amounts and concentrations of sulfuric acid, most of the color and a considerable portion of the unsaponifiable matter, including the phytosterol, can be removed. The required selectivity is secured by effecting this treatment under strictly controlled conditions of temperature, quantity and concentration of the sulfuric acid, and time of contact between the acid and the oil treated.

Briefly, our process is as follows: We dissolve tall oil in a petroleum solvent, cool the solution to preferably below 25° C. and, while stirring, we add sulphuric acid, either in one large or several smaller portions. The precipitate formed is removed by filtration or centrifuging. If the sulphuric acid treatment is effected in several stages, the precipitate is always separated from the solution after each application of acid. The clear solution finally obtained is refluxed or otherwise washed with water and treated with a bleaching earth. The solvent is then distilled off and a clear, light colored and practically odorless oil is obtained.

While we prefer to dissolve the tall oil previously to treating with sulphuric acid in a solvent, our process does not necessarily require the presence of a solvent. On reacting tall oil alone with sulphuric acid we obtain similar results as with tall oil in solution. Our process also can be practiced by adding the solvent after the treatment of the oil with sulphuric acid, the addition of the solvent greatly facilitating the clean separation of the precipitate. Another modification of our process consists of treating tall oil with sulphuric acid, separating the precipitate and washing the precipitate with a solvent to remove the oil contained in the precipitate.

From the precipitate or sludges we obtain, after removing the sulphuric acid contained therein, valuable by-products. From the petroleum soluble portion of these sludges we recover phytosterol, the petroleum insoluble portion we use as binders in plactic compositions. The recovery of phytosterol is effected in the same manner as set forth in our co-pending application No. 169,655, filed October 18, 1937.

We will now describe in detail the individual steps of our process, without, however, limiting our application to the precise conditions of temperature, concentration, etc., as specified in the examples and preferences given. This latitude must be recognized as a necessary part of our invention, since the term "tall oil" describes a commercial entity, the composition of which varies substantially and depends on the location from which the coniferous wood for the kraft pulp manufacture is obtained, together with variations in individual mill practice in cooking, on the method whereby tall oil is obtained from the black liquor and other factors. Due to these factors the composition of different tall oils varies not only as to main components—fatty acids, resin acids and unsaponifiable-, but also as regards impurities, such as small quantities of lignin substances, inorganic salts and water content. To make our process useful for the refining of tall oils of different origin, details in our procedure of refining have to be varied, each tall oil requiring a somewhat different treatment, especially as to concentration and quantity of sulphuric acid used.

As solvent for the tall oil we prefer a petroleum hydrocarbon of narrow boiling range, such as for instance, dry cleaners naphtha or varnish makers naphtha. Our preferred dilution is one part by volume of tall oil to one of solvent.

The temperature at which the sulfuric acid treatment is made, is of considerable importance from the standpoint of the quality of the refined oil and the yield of by-products obtained, especially phytosterol. We have found that the selectivity of the action of sulfuric acid on the unsaponifiable matter is, generally speaking, greater, as the temperature is lowered. Possible side reactions caused by the presence of sulphuric acid, such as sulfonation, polymerization, and sulphuric acid ester formation are also repressed as the temperature is lowered. The color of the refined oil is the better, the lower the temperature at which the sulphuric acid treatment is effected. Finally the yield of by-products, especially that of phytosterol, is considerably greater at lower, than at ordinary or higher temperatures. A lower limit of a useful temperature is reached when the action of sulphuric acid is too weak for practical purposes. The decreased solubility at lower temperatures of tall oil in the solvent also sets a lower limit to the temperature used. We therefore prefer to keep the temperature of the tall oil solution between 0° C. and about 20° C. A somewhat higher temperature is used when treating tall oil in the absence of a solvent. In this case we prefer to work at about or above 30° C. in order to decrease the viscosity of the tall oil and thus facilitating the separation of the precipitate.

The effect of the temperature on the color of the finished oil is illustrated by the following table. Here tall oil naphtha solutions were treated with 9% by weight of sulphuric acid as calculated on the tall oil:

| Temperature, °C. | Color | | |
|---|---|---|---|
| | F. A. C. | Lovibond | |
| | | Red | Yellow |
| −9 | 13 | 5.5 | 50 |
| 1 | 11 | 5.5 | 42 |
| 15 | 15 | 8.0 | 49 |
| 30 | 11B | 14.0 | 80 |

We use sulfuric acid of 66° Bé. strength although acid of lower strength can be used in some cases. If the sulfuric acid treatment is effected in several stages, the first treatment can be made with a weaker, for example, 60° Bé sulfuric acid, and the strength of the acid used in the successive treatments gradually increased. This variation of our process gives an especially light colored refined oil.

Of vital importance as to the final results is the quantity of the sulfuric acid used. If we react tall oil with the total quantity of acid required to obtain a certain color, let us say 10 per cent by weight of sulfuric acid on the weight of tall oil, we obtain a dark colored, viscous sludge which contains the coloring matter, phytosterol, a large portion of polymerized products originating mostly from the unsaturated portion of the unsaponifiable matter and a minor portion of the reaction products of fatty and resin acids with sulfuric acid. The separation of the coloring matter and the phytosterol from this sludge is possible although on a practical scale rather tedious and expensive.

We have found on the other hand, that by effecting the treatment with sulfuric acid in several stages, instead of in one, we can separately and independently from other portions of the sludge, precipitate the coloring matter and phytosterol together, in such a form which makes their recovery, especially that of the valuable phytosterol, a profitable commercial procedure. For instance, if we react a solution of tall oil with 2 to 4 per cent by weight of sulfuric acid as calculated on the weight of tall oil, we obtain a solid, light brown precipitate which consists essentially only of the coloring matter and phytosterol. If now this precipitate is separated from the solution and the same solution again reacted with a larger quantity, let us say 6 to 8 per cent by weight of sulfuric acid, then we obtain a dark brown, viscous, liquid sludge which for the most part originates from the unsaturated hydrocarbon portion of the unsaponifiable matter, the removal of which enhances the value of the refined oil. While our process can be carried out with either one large addition of sulfuric acid or with several smaller additions, we prefer the latter, stepwise reaction with sulfuric acid, as it makes the isolation of the coloring matter and especially that of the phytosterol practically feasible. Instead of two sulphuric acid additions we might make three or more, after each addition, however, removing the precipitate or sludge formed before the next treatment is made. The manner of adding the sulphuric acid also has a considerable influence on the color of the finished oil. For example, in treating tall oil naphtha solutions with 9% of sulphuric acid by weight as calculated on the tall oil, we obtain a color of 17 on the F. A. C. scale (Lovibond R–11.0, Y–75) when the sulphuric acid was added at once. On adding the same quantity of acid in three portions the final color was 13 F. A. C. (Lovibond R–6.2, Y–44).

There is an optimum of time for the action of the sulfuric acid on the oil to under treatment. Sufficient time must be allowed for the completion of the formation of the precipitate or sludge. On a laboratory scale this may be a matter of a few minutes to about an hour. After the precipitate or sludge has fully developed we remove it at once and thereby prevent undesirable side reactions between the acid sludge and the unattacked portion of the oil. If a longer contact time is allowed, a portion of the sludge may become redissolved in the tall oil solution and unfavorably affect the color of the finished product. Thus stirring tall oil solutions with sulphuric acid for 5, 30 and 60 minutes we obtain finished oils with colors 13 F. A. C. (Lovibond R–6.0. Y–46), 11 F. A. C. (Lovibond R–5.5, Y–42), and 11 A F. A. C. (Lovibond R–10.0, Y–45), respectively.

As a next step in our process of refining the tall oil solution we wash it with water preferably at a higher temperature under reflux until the sulfuric acid is removed from the oil solution. This treatment causes a considerable improvement in color. Now the tall oil solution may be treated with a sufficient quantity, for instance 5 to 10 per cent, of fuller's earth.

As a final step in our process of refining the tall oil we remove the solvent by distillation and obtain a viscous oil of light yellow color and consisting essentially of fatty acids and resin acids contaminated with a small quantity of residual unsaponifiable matter.

The following examples are illustrative of our process, although it is to be understood that we do not limit ourselves particularly thereto for the reasons hereinbefore set forth:

*Example I*

Five hundred grams of tall oil from southern coniferous woods, containing 50.5% fatty acids, 40.0% resin acids and 9.5% unsaponifiable matter, are dissolved in 500 cc. naphtha and cooled to 17° C. Thirty-five grams of 66° Bé. sulphuric acid is added and the mixture stirred for one hour. The mixture is now centrifuged, the clear solution thereby being separated from the sludge. The sludge is washed with small portions of naphtha, the washings being added to the solution. The clear solution is now refluxed with about one half of its volume of water, the water being changed once or twice until free of acid as tested by methyl orange or litmus indicators. After separation from the water layer the solution is stirred with 45 grams of fuller's earth, the earth separated and washed with naphtha, and the naphtha removed from the solution by distillation in vacuo. Four hundred and fifty grams of refined, light colored oil are obtained of the following composition: 53.5% fatty acids, 42.5% resin acids, 4.0% unsaponifiable matter.

*Example II*

Five hundred grams of tall oil from southern coniferous woods of the same composition as in Example I are dissolved in 500 cc. naphtha and the solution cooled to 17° C. Ten grams of sulphuric acid (1.84) are added and the mixture stirred for half an hour. The mixture is now centrifuged, the clear solution separated from the precipitate and the latter washed with small portions of naphtha, the washings being added to the solution. The solution is again cooled to 17° C. and, while stirring, reacted with 25 grams sulphuric acid. The resulting sludge largely settles to the bottom of the reaction vessel, the suspended portion of the sludge is removed by centrifuging. The clear solution is now refluxed with water, treated with fuller's earth and the naphtha distilled. Four hundred and forty-one grams of a refined oil are obtained which has practically the same composition as under Example I, but is of a considerably lighter color. From the precipitate obtained in the first sulphuric acid treatment seven grams of phytosterol and six grams of petroleum insoluble coloring matter are recovered.

*Example III*

Five hundred grams of a tall oil from northern coniferous woods containing 30% fatty acids, 45% resin acids and 25% unsaponifiable, are dissolved in 500 cc. naphtha and the solution cooled to 2° C. Twelve grams of sulphuric acid (1.84) are added and the mixture stirred for an hour, centrifuged, the clear solution again cooled to 2° C. and reacted with 35 grams of sulphuric acid. After separating from the sludge the solution is refluxed with water until free of mineral acid, treated with 35 grams fuller's earth and the naphtha removed by distillation. A light colored refined oil is obtained (384 grams) which contains 37.5% fatty acids, 56.2% resin acids and 6.3% unsaponifiable matter. From the precipitate obtained in the first sulphuric acid treatment 3.5 grams of phytosterol are recovered.

We claim as our invention:

1. The process of refining crude tall oil, which comprises treating tall oil at a temperature of approximately 25° C. to about 30° C. with a quantity of 60° to 66° Bé. sulfuric acid sufficient to precipitate only the coloring matter and phytosterol content thereof, separating the resulting acid sludge from the tall oil, washing the tall oil with water, and recovering refined tall oil therefrom.

2. The process of refining tall oil which comprises dissolving tall oil in a solvent, cooling the solution to a temperature of from approximately 0° to 25° C. and treating the solution in several successive steps with separate increments of a quantity of sulfuric acid sufficient to successively precipitate the coloring matter, phytosterol, and unsaponifiable matter content thereof, and separating from the solution the products of the reaction after each application of the acid.

3. The process of refining tall oil which comprises dissolving tall oil in a solvent, cooling the solution to a temperature of from approximately 0° to 25° C. and treating the solution in several successive steps with separate increments of sulfuric acid sufficient to successively precipitate the coloring matter, phytosterol and, unsaponifiable matter content thereof, the first addition being made with about 60° Bé. sulfuric acid and the successive additions with acid of gradually increasing strength.

4. The process of refining crude tall oil which comprises treating tall oil at a temperature of approximately 30° C. with sulfuric acid in a quantity and of a strength sufficient to precipitate only the coloring matter and the phytosterol therefrom.

5. The process of refining crude tall oil which comprises treating tall oil at a temperature below about 30° C. with sulfuric acid in a quantity sufficient to precipitate the coloring matter and a substantial portion of the unsaponifiable matter including phytosterol.

6. The process of removing the coloring matter and phytosterol from crude tall oil which comprises dissolving tall oil in a solvent and treating the solution while cooled to a temperature of 30° C. to 0° C. with approximately 2 to 4 percent by weight of 60° to 66° Bé. sulfuric acid as calculated on the weight of the tall oil.

7. The process of removing the coloring matter and a substantial portion of the unsaponifiable matter, including phytosterol from crude tall oil, which comprises dissolving tall oil in a solvent, cooling the solution to below 30° C. and treating it with approximately 10 percent by weight of sulfuric acid as calculated on the weight of the tall oil.

8. The process of refining tall oil which comprises dissolving the tall oil in a solvent, cooling the solution to a temperature below 25° C., treating the solution with approximately 2 to 4 per cent of sulfuric acid by weight of the tall oil, removing the resultant precipitate and matter thrown out of solution therefrom, treating the filtered solution with 6 to 8 per cent of sulfuric acid by weight of the tall oil, and separating the resultant sludge from the solution.

9. The process of refining crude tall oil which comprises dissolving tall oil in a solvent, cooling the solution to a temperature of between 20° to 0° C. and treating with sulfuric acid in a quantity and of a strength sufficient to precipitate the coloring matter and a substantial portion of the unsaponifiable matter including phytosterol.

10. The process of refining crude tall oil which comprises dissolving tall oil in a petroleum solvent, cooling the solution to a temperature of between 20° C. to 0° C. and treating the solution with sulfuric acid in a quantity and of a strength sufficient to precipitate the coloring matter and a substantial portion of the unsaponifiable matter including phytosterol.

11. The process of refining tall oil which comprises dissolving tall oil in a solvent, cooling the solution to a temperature below 25° C., treating the solution with a quantity of sulfuric acid sufficient to precipitate only the coloring matter and the phytosterol therefrom, separating the precipitate from the solution, again treating the solution with a sufficient quantity of sulfuric acid to precipitate a substantial portion of the remaining unsaponifiable matter, separating the resulting sludge from the solution, washing the solution with water, treating the solution with an adsorbent earth or active carbon, and recovering refined tall oil from the tall oil solution.

12. The process of refining crude tall oil and separating coloring matter, phytosterol and unsaponifiable matter therefrom which comprises, cooling the tall oil to a temperature of from 0° to approximately 30° C., treating it in several successive steps with separate limited amounts of sulfuric acid sufficient to successively precipitate the coloring matter, phytosterol, and unsaponifiable matter content thereof, and separating the resultant precipitate and matter thrown out of solution after each application of the acid.

13. The process of refining crude tall oil which comprises dissolving tall oil in a petroleum solvent, treating the solution at a temperature below 30° C. with a quantity of 60° to 66° Bé. sulfuric acid sufficient to precipitate only the coloring matter and phytosterol content thereof, separating the resulting acid sludge from the tall oil solution, washing the solution with water, and recovering refined tall oil therefrom.

14. The process of refining crude tall oil which comprises dissolving tall oil in a solvent, cooling the solution to a temperature below 25° C., treating with approximately from 2 to 12% by weight of the tall oil of from about 60° to about 66° Bé. sulfuric acid, separating the precipitated matter, and recovering refined tall oil from the solution.

15. The process of refining crude tall oil which comprises reacting tall oil at a temperature of approximately 30° C. with approximately from 2 to 12% by weight of the tall oil of about 60° to about 66° Bé. sulfuric acid, separating the precipitated matter and recovering refined tall oil from the solution.

FREDERICK H. GAYER.
CHARLES E. FAWKES.